United States Patent [19]

Sergent

[11] Patent Number: 5,549,429
[45] Date of Patent: Aug. 27, 1996

[54] RATCHET-OPERATING TOOL FOR STRAP-TIGHTENING MECHANISM

[76] Inventor: Delores A. Sergent, 11114 Oak Creek Dr., Lakeside, Calif. 92040

[21] Appl. No.: 434,675

[22] Filed: May 4, 1995

Related U.S. Application Data

[63] Continuation of Ser. No. 226,774, Apr. 12, 1994, abandoned.

[51] Int. Cl.⁶ .................................. G05G 1/00; B25F 1/00
[52] U.S. Cl. ........................ 410/96; 410/100; 410/156; 74/544; 81/177.2; 16/114 R
[58] Field of Search ................... 410/100, 10, 11, 410/12, 23, 50, 103, 96, 97, 156; 81/486, 177.1, 15.8, 121.1, 124.2, 177.2; 24/68 R, 68 CD, 68 CT, 69 ST, 71 ST, 69 CT, 71 R, 71 TD; 74/543, 544, 545, 546, 547; 254/243, DIG. 3; 16/110 R, 114 R

[56] References Cited

U.S. PATENT DOCUMENTS

| | | | |
|---|---|---|---|
| 3,011,349 | 12/1961 | Kratz | 81/124.2 X |
| 3,119,278 | 1/1964 | Simpson | 74/544 |
| 3,657,944 | 4/1972 | Able | 74/544 |
| 3,843,981 | 10/1974 | Verest | 74/544 X |
| 3,864,769 | 2/1975 | Hamilton | 74/544 X |
| 4,125,913 | 11/1978 | Lewis | 81/124.2 X |
| 4,257,644 | 3/1981 | Stephens | 410/12 X |
| 4,297,916 | 11/1981 | Burroughs | 74/544 |
| 4,510,651 | 4/1985 | Prete, Jr. et al. | 74/544 X |

FOREIGN PATENT DOCUMENTS

| | | | |
|---|---|---|---|
| 0246210 | 11/1987 | European Pat. Off. | 410/100 |
| 7713216 | 6/1979 | Sweden | 410/100 |

*Primary Examiner*—Karen B. Merritt
*Assistant Examiner*—Stephen Gordon
*Attorney, Agent, or Firm*—Henri J. A. Charmasson; John D. Buchaca

[57] ABSTRACT

A tool for manipulating a ratcheted strap-tightening mechanism such as those associated with cargo securing harnesses. The tool comprises a handle having at a first end a socket adapted to engage the lever of the ratcheting mechanism, and, at an opposite second end, a tongue adapted to unlock the ratcheting mechanism. The socket defines a tapering channel that can accommodate a variety of levers of different shapes and sizes.

5 Claims, 2 Drawing Sheets

RATCHET-OPERATING TOOL FOR STRAP-TIGHTENING MECHANISM

This application is a continuation of 08/226,774 filed Apr. 12, 1994, and now abandoned.

FIELD OF THE INVENTION

This invention relates to ratcheted strap-tightening mechanisms, and more specifically to those ratcheting mechanisms used in connection with cargo-securing harnesses.

BACKGROUND OF THE INVENTION

Strap-tightening ratchet assemblies are commonly used in connection with cargo-securing harnesses such as the one used to secure a load on board an airplane or on board ship. The ratchet mechanisms are usually provided with a short tightening lever that seldom exceeds 10 cm (4 inches) and therefore provides very little leverage. Accordingly, such cargo-securing harnesses can only be tightened to a limited extent. Such ratcheted mechanisms can only be released by manually pushing a ratchet-locking pawl which is spring-biased against a toothed wheel. In order to release the tightening mechanism it is often required to move the lever in the tightening direction in order to relieve the clamping action of the toothed wheel against the pawl before the pawl can be manually pushed back.

This type of ratcheted strap-tightening mechanism is used in connection with wheelchair tie-down harnesses commonly used in public transportation vehicles such as the one disclosed in U.S. Pat. No. 4,257,644 Stephens. This type of wheelchair anchoring device is required by law in several states. Since the wheelchairs are usually secured to anchor points bolted to the floor of the vehicle, the ratcheted strap-tightening mechanism is often positioned very close to the vehicle floor in locations which are not easily accessible, making the tightening and releasing operation not only awkward, but sometimes hazardous.

SUMMARY OF THE INVENTION

The principal and secondary objects of this invention are to provide a tool to conveniently and painlessly manipulate a ratcheted, strap-tightening mechanism by providing added leverage during the tightening operation as well as the ratchet-releasing process, where such tool is particularly adapted for use in hard-to-reach locations.

These and other valuable objects are achieved by a ratchet mechanism manipulating tool which has, at one end, a socket adapted to engage over the short ratcheting lever of the mechanism to extend its length and has, at the other end, a bracket shaped and dimensioned to leveredly pry the ratchet-locking pawl away from its toothed wheel when the mechanism is to be released. The tool is particularly useful in the manipulation of ratcheting mechanisms used in connection with wheelchair anchoring harnesses mounted in buses and other vehicles.

DESCRIPTION OF THE PREFERRED EMBODIMENT OF THE INVENTION

Figure 1:
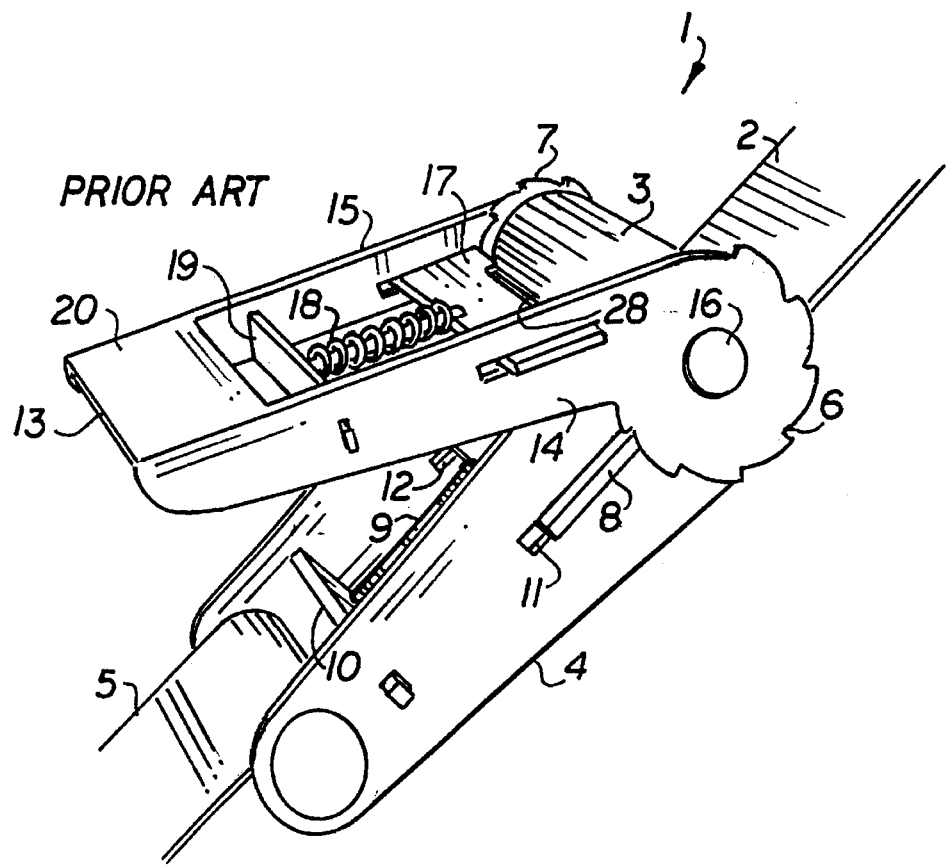
FIG. 1 illustrates a ratcheting, strap-tightening mechanism of the prior art.

Referring now to the drawing, there is shown in FIG. 1 a ratcheted strap-tightening assembly 1 of the prior art. The assembly is designed for tightening a packing or securing harness by progressively winding the end of a first length of strap 2 over a roller or drum 3 installed at a first end of a frame 4 which is secured at an opposite end to the end of a second length of strap 5. A pair of toothed wheels 6, 7 associated with the roller 3 are prevented from turning in a counter-clockwise direction that would unwind the first length of strap 2 by a pawl 8 mounted within the frame 4. The pawl is resiliently urged toward the toothed wheels by a coil-spring 9 sitting against a barrier 10. The pawl 8 has its opposite lateral ends captured by a pair of slots 11, 12 in the sides of the frame. The slots are sufficiently long to allow the forced withdrawing of the pawl 8 toward the barrier and against the spring 9 in order to disengage the pawl from the toothed wheels and allow unwinding of the first length of strap 2. A cranking lever 13 has two parallel arms 14, 15 having ends rotatively and concentrically secured to the common axle 16 of the drum 3 and toothed wheels 6, 7. The arms of the cranking lever are positioned astride the drum, frame and toothed wheels. A second-pawl 17 spanning the two arms is resiliently biased against the toothed wheels by a second coil-spring 18 resting against a barrier 19 also mounted between the arms of the lever near its distal end 20. The toothed wheels and associated drum can be progressively turned in a strap-tightening clockwise direction by repeatedly oscillating the lever between a rest position substantially parallel to the axis of the frame and lengths of strap and a maximum travel position substantially perpendicular to said axis.

Once the arms have been tightened and the toothed wheels are engaged by the first pawl 8, the cranking lever can be moved back to the rest position where its pawl 17 rests against the arcuate backs of a pair or teeth of the respective toothed wheels, and is not contributing to the locking of the mechanism. In that position the cranking bracket pawl 17 is positioned at a greater radial distance from the rotating axis of the toothed wheels by comparison to the locking pawl 8 of the frame. The cranking lever pawl 17 can then be easily urged back by pushing a notched central portion 28 in order to provide access to the locking pawl 8. The mechanism can be released by pushing back this locking pawl 8 against its spring 9 with the index finger. If the mechanism has been cranked very tightly, it may be necessary to rotate the lever in a clockwise direction in order to release the pressure of the teeth against the main pawl 8 before it can be manually pushed back.

Figure 2:
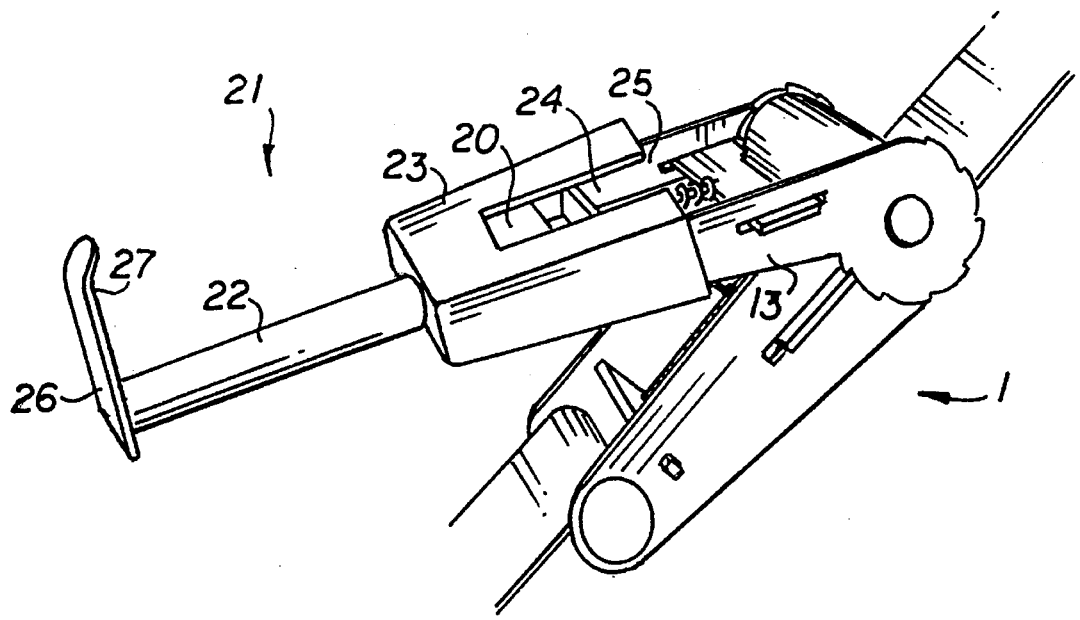
FIG. 2 illustrates the combination of the manipulating tool and mechanism during the tightening process.
Figure 3:
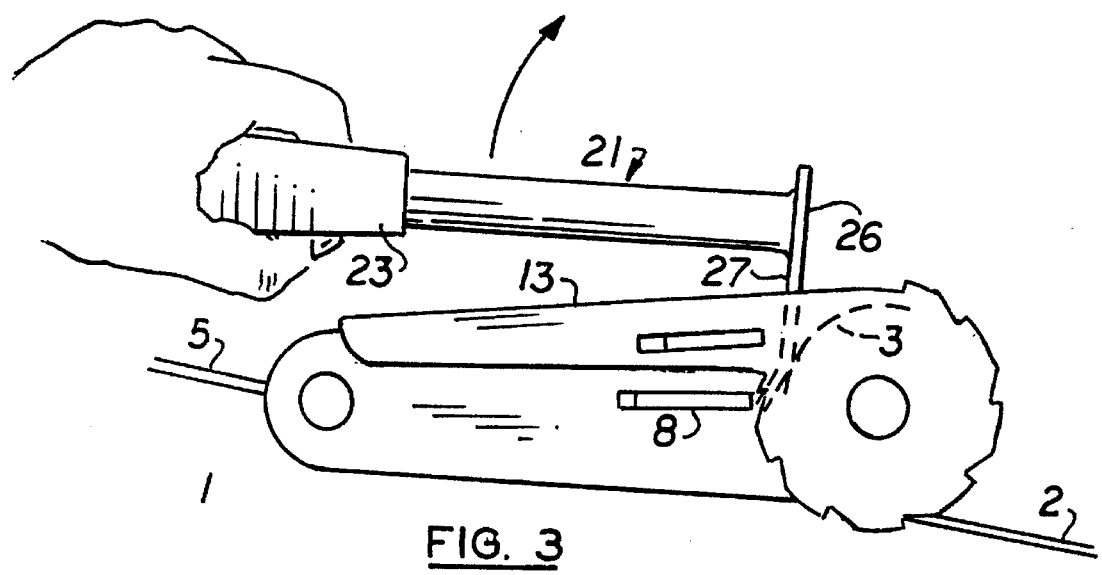
FIG. 3 illustrates the use of the tool in the releasing process.

As shown in FIG. 2, a ratchet mechanism manipulating tool 21 is used in combination with the strap-tightening assembly 1 to increase the length of the cranking lever 13, thus providing added torque for ease of operation. The tool consists essentially of a rod 22 having at a first end a socket 23 which defines a channel 24 shaped and dimensioned to engage over the distal end 20 of the cranking lever 13. The channel 24 tapers down from its distal opening 25 toward its connection with the rod 22. Being so shaped, the socket can be conveniently secured over a variety of cranking levers having different lengths or widths. The smaller the lever, the more deeply it penetrates the socket. It should be understood that the,socket may be specially configured to interface with a particular type or size of cranking lever and may define a trapezoidal internal cavity as illustrated in FIG. 2 or a rectangular cavity 29 as illustrated in the alternate embodiment 30 of the tool shown in FIG. 4, or any other equivalent configuration dictated by the shape and size of the cranking lever.

Figure 4:
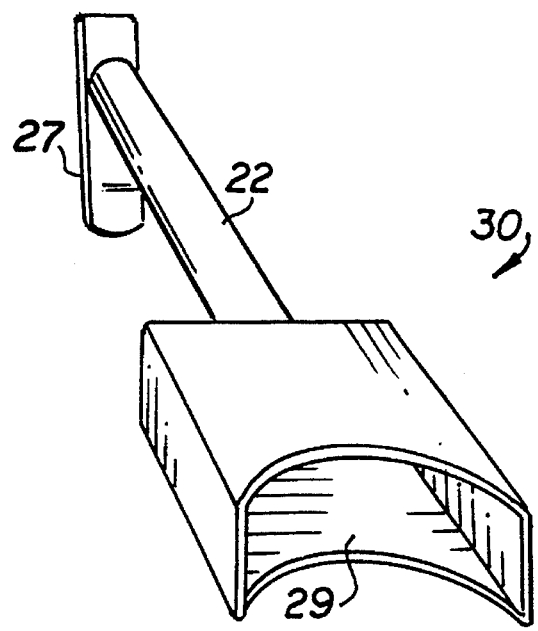
FIG. 4 illustrates an alternate embodiment of the manipulating tool.

At the other end of the rod 22 opposite the socket 23 is secured a generally foot-shaped bracket 26 having a tongue 27 shaped and dimensioned to be inserted between the locking pawl 8 and the drum 3 where it can be rocked to pry the pawl away from the toothed wheels and thus release the mechanism. This release action can be accomplished without having to manipulate the cranking lever 13 to release the pressure of the toothed wheels against the pawl 8. Accordingly, a formerly arduous and two-handed process turns into an effortless one-handed operation as illustrated in FIG. 4.

It should be understood that the size and shape of the bracket 26 can be equivalently modified to accommodate various types of ratcheting mechanisms.

While the preferred embodiments of the invention have been described, modifications can be made and other embodiments may be devised without departing from the spirit of the invention and the scope of the appended claims.

What is claimed is:

1. The combination of a ratcheted strap-tightening mechanism having a hand-operable cranking lever and a resiliently biased ratchet-locking member, and a manipulating tool, said tool comprising:
   a rod;
   a socket having a proximal end attached at a first end of said rod and a distal end opposite said proximal end, said socket comprising four flat joined sides defining a channel shaped and dimensioned to axially engage over said lever; and
   a tongue projecting from a second end of said rod opposite said first end, said tongue being shaped and dimensioned to leveredly bear against said resiliently biased member and pry it away from a locking position to release said mechanism;

wherein at least two opposite ones of said sizes taper inwardly down axially from an opening at said distal end toward said first end of the rod, whereby said socket can be securely engaged over a plurality of levers of different sizes.

2. The combination of claim 1 wherein said tongue projects substantially at a right angle from said rod.

3. The combination of claim 2, wherein said socket comprises a substantially trapezoidal enclosure having an open base defining said distal opening.

4. The combination of a ratcheting strap-tightening mechanism having a frame secured to a first length of strap, a spool for winding thereupon a second length of strap, said spool being rotatively mounted within said frame and having at least one toothed wheel and a pawl spring-biased against said at least one toothed wheel to prevent unwinding movement of said spool, and an oscillating lever for turning said spool in a strap-winding direction; and a manipulating tool consisting of
   a rod;
   a socket secured to a first end of said rod and comprising four flat joined sides defining a channel shaped and dimensioned to axially engage over said lever and provide additional leverage when winding said second length of strap upon said spool; and
   a tongue projecting substantially orthogonally from a second end of said rod opposite said first end, said tongue being shaped and dimensioned to be inserted between said spool and said pawl to disengage said pawl from said at least one toothed wheel, wherein at least two opposite ones of said sides taper inwardly down from a distal opening toward said first end whereby said socket can securely engage a plurality of levers of different sizes.

5. The combination of claim 4, wherein said socket comprises a substantially trapezoidal enclosure having an open base defining said distal opening.

* * * * *